United States Patent [19]
Bupara

[11] Patent Number: 4,675,694
[45] Date of Patent: Jun. 23, 1987

[54] METHOD AND APPARATUS FOR A HIGH DENSITY ARRAY PRINTER USING HOT MELT INKS

[75] Inventor: Sargit S. Bupara, New Milford, Conn.

[73] Assignee: Exxon Printing Systems, Inc., Brookfield, Conn.

[21] Appl. No.: 838,767

[22] Filed: Mar. 12, 1986

[51] Int. Cl.[4] .................... G01D 9/00; G01D 15/16; G01D 15/10

[52] U.S. Cl. .................... 346/1.1; 346/76 PH; 346/140 R

[58] Field of Search ....... 346/140 R, 76 PH, 140 PD, 346/1.1

[56] References Cited

U.S. PATENT DOCUMENTS 3,655,379 4/1972 Gundlach .................... 346/140 PD
4,462,035 7/1984 Koto .................... 346/76 PH

*Primary Examiner*—E. A. Goldberg
*Assistant Examiner*—Mark Reinhart
*Attorney, Agent, or Firm*—Kenneth R. Schaefer

[57] ABSTRACT

A high density printer includes a printing plate having an array of through holes of capillary dimension, and individual heaters located within each hole near one face of the printing plate, whereby printing is accomplished by placing the other face of the printing plate in contact with a pool of liquified phase change ink for a period of time sufficient to allow ink to fill each hole via capillary action, after which time the printing plate is removed from the ink and allowed to cool for solidifying the ink within each hole, whereafter selective ones of the heaters are energized for melting ink in associated holes, whereupon the ink expands away from the solidified ink in the portions of the holes below the heaters, causing ink to protrude from the associated holes on the one face in a desired pattern for transfer to a substrate brought into intimate contact with the one face.

11 Claims, 9 Drawing Figures

METHOD AND APPARATUS FOR A HIGH DENSITY ARRAY PRINTER USING HOT MELT INKS

FIELD OF THE PRESENT INVENTION

This inventon relates to the field of high density printers, and more specifically to such printers using phase-change inks that are solid at room temperature and liquid at some elevated temperature above room temperature.

BACKGROUND OF THE INVENTION

Many attempts have been made in the prior art to develop methods and apparatus for providing high density printing, such as the printing of a character or a page at a time. For example, in Cielo U.S. Pat. No. 4,275,290 a thermally activated liquid ink printing head is disclosed having a plurality of orifices in a wall of an ink reservoir, with the ink being retained in the orifices by surface tension. Electrical heating elements are included within each ink chamber to heat all of the ink in the orifices, for causing the ink to flow from the orifices to a paper sheet positioned adjacent thereto. It is further taught that the orifices may extend in a line across the head or may be in other predetermined patterns, for printing entire characters at a time. The ink may be transferred to the paper in a completely or partly vaporized state, and may be of a composition that permits heating current to flow through the ink. Alternatively, the application of the heat is used to reduce the surface tension of the ink within the orifices, causing the ink to move out of the orifice being heated. Another Cielo U.S. Pat. No. 4,164,745 discloses the selective heating of ink under constant pressure in a reservoir, for modlating the viscosity of the ink to control the volume of ink ejected from an associated orifice.

A printer providing an electrostatic capillary apparatus is disclosed in Bettia U.S. Pat. No. 3,750,564, wherein a printing surface is provided by a plurality of capillary media filled with writing liquid, for accomplishing printing by positioning a recording carrier adjacent the capillary media, and causing electrokinetic movement of the writing fluid from the capillaries to the recording carrier via the application of a voltage across the capillary media.

In Hendricks, Jr. U.S. Pat. No. 3,545,374, entitled "High-Speed Printer Employing a Discharge Matrix", a perforated insulator material is provided with electrodes within each perforation to initiate ionization of a gas therein via selective application of an electrical signal, whereby the gas so produced is maintained in an ionized state by an electric potential connected between outer electrodes. A web is placed across open ends of the perforations for receiving the ionized gas emitted from the perforations for imprinting a pattern upon the web.

In Naiman U.S. Pat. No. 3,211,088, a non-contact printer is disclosed which includes a matrix of individual print means for printing individual dots therefrom in a desired pattern determined by appropriate selection of the individual print means during a printing cycle. The individual print means are provided by apertures bored into a mounting surface, whereby each aperture is in the form of an exponential horn with the small end of the horn at the exit hole on the mounting surface closest to the surface which is to be printed upon. The opposite end of the horn, of each printing means, having the largest diameter of the horn, is immersed in ink, whereby a pressure producing transducer is placed in the ink below the horn portion, and selective ones of the transducers are energized for producing a pressure wave for causing ink to be jetted from the smaller ends of the selected ones of the exponential horns to the under surface of a paper being held adjacent these smaller ends for printing upon the paper.

No one or combination of the above-indicated references teach or even allude to methods or apparatus for using a phase-change ink, which is solid at room temperature and liquid at some elevated temperature above room temperature, in a high density array printer.

SUMMARY OF THE INVENTION

It is an object of the present invention to provide a method and apparatus for printing with an ink that changes phase from a solid state to a liquid state at elevated temperatures above room temperature, and in so changing state expands in volume.

Another object of the invention is to provide a high density array or matrix printer for utilizing a phase change ink.

A further object of the invention is to provide a relatively inexpensive printer for printing a page at a time.

A method and apparatus for carrying out the above-mentioned objects of the invention, as well as other objects, includes a printing plate having a matrix or array of through holes of capillary dimension, with selectively energizeable heating means located within each hole near an orifice face of the printing plate and remote from an opposite chamber face thereof, whereby printing is accomplished by first bringing the chamber surface of the printing plate into contact with a pool of liquified hot melt or phase change ink for a sufficient time to heat the plate and permit the holes to be filled with ink, whereafter the plate is removed and cooled for solidifying the ink within the holes, and after solidification of the ink, selectively energizing individual ones of the heating means for melting the ink near the orifice surface of the printing plate, causing the melted ink to expand in a direction away from the solid plug of ink remaining in the poriton of the selected holes near the chamber surface of the printing plate, whereby the expanding ink acts as a driver means for driving ink out of the selected holes in a manner causing the ink to protrude from the selected holes in a desired pattern for transfer to a substrate brought into intimate contact with the orifice face of the printing plate, thereby printing a desired pattern upon the substrate.

BRIEF DESCRIPTION OF THE DRAWINGS

In the drawings, wherein similar items are indicated by the same reference number, the invention will be described with reference to the following drawings in which.

DESCRIPTION OF THE PREFERRED EMBODIMENTS

Figure 1:
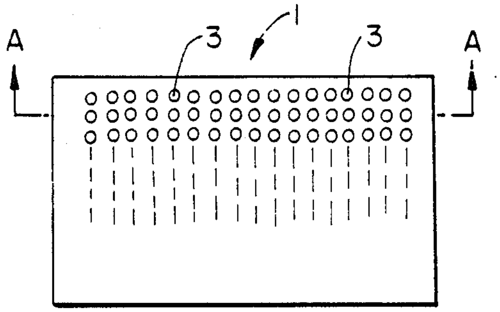
FIG. 1 is a top view of the orifice face or printing face of a printer plate of one embodiment of the invention.

With reference to FIG. 1, a printing plate 1 is provided with a plurality of through holes 3 arranged in an X-Y or other desired matrix. For simplicity, only a portion of the through holes 3 are shown. The diameter of the through holes 3 are each $3\times10^{-3}$ inch or smaller, in this example, for providing a capillary dimension to each one of the holes 3. The printing plate 1 may be of any desired dimension, and is in this example assumed to be dimensioned for providing a page at a time printer. The greater the number of through holes 3 included through the printing plate 1, the greater the density of print that may be obtained from the plate, as later described. It is important that the printing plate 1 be fabricated from a material that is relatively non-conductive to heat, such as a ceramic, or heat resistant plastic, for example. It is also important to maintain thermal isolation between through holes 3, and to minimize heat transfer from an upper portion of a through hole 3 to a lower portion of the same hole 3.

Figure 2:
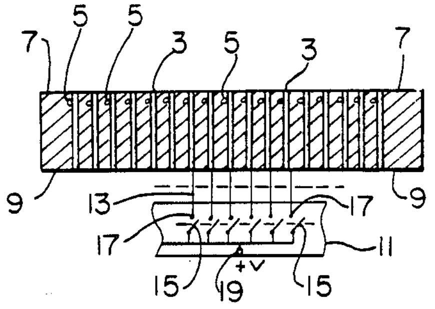
FIG. 2 is a cross-sectional view along line A—A of the printing plate of FIG. 1, and includes a partial block schematic diagram of a controller of one embodiment of the invention.

In FIG. 2, a cross-sectional view of the printing plate 1 along line A—A is shown. Resistive heating elements 5 (in this example) are embedded within the walls of each one of the holes 3 near a printing face or orifice surface 7 of the printing plate 1, remote from the opposite or chamber face 9 thereof. A controller 11 includes, in this example, a plurality of individual switches 15 electrically connected to individual ones of the resistive elements 5 via electrical conductors 13 as partially shown, for sake of simplicity. The conductors 13 are connected to the terminals 17, respectively, of the switches 15, with the other ends or terminals of the switches 15 (single pole single throw switches) are connected in common to a source of DC voltage +V at power terminal 19, for example. The resistive heating elements 5 are selectively energized via closure of the associated switch 15 of the controller 11, in this example.

Figure 3:
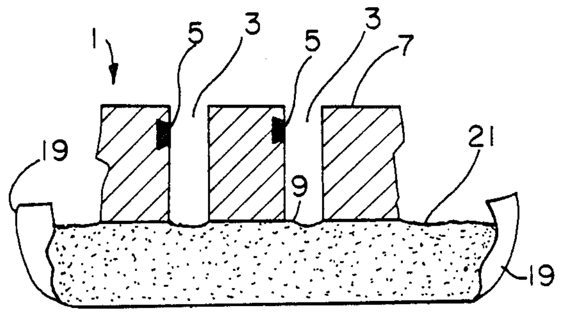
FIG. 3 shows a detail view of a portion of the cross-sectional view of FIG. 2 in initial contact with a hot-melt ink in liquified state.

With reference to FIG. 3, a container 19 shown in partial cutaway view is filled with a hot-melt or phase-change ink composition 21. Such a composition of ink may include, for example, the ink compositions disclosed in U.S. Pat. Nos. 4,390,369 and the CIP thereof 4,484,948, each assigned to the assignee of the present invention. Other phase-change hot-melt ink compositions may also be used, the present composition being given only to illustrate the composition used by the present inventor in developing the present invention.

Figure 4:
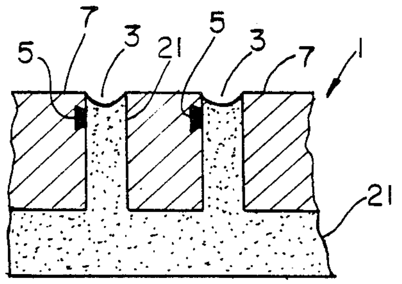
FIG. 4 shows a detail view of the printing plate of FIG. 3 a period of time after initially making contact with the liquified phase change or hot melt ink.
Figure 5:
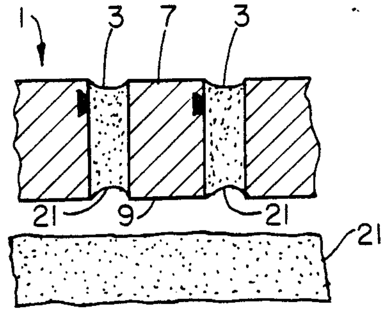
FIG. 5 shows a detailed view of the printing plate of FIG. 4 immediately after being withdrawn from the pool of hot melt ink.
Figure 6:
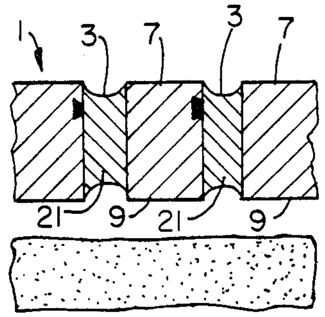
FIG. 6 shows a detailed view of the printing plate at a time after solidification of the ink within capillary holes of the printing plate.
Figure 7:
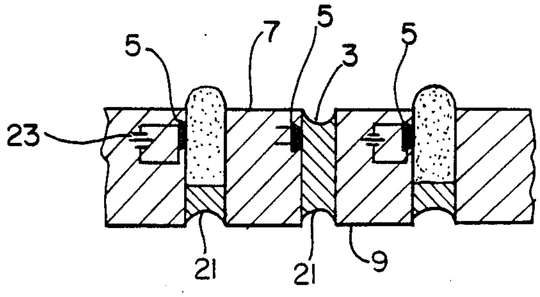
FIG. 7 shows a detail view of a cross-section of a number of holes in the printing plate certain ones of which are being heated in portions near the orifice face of the printing plate and remote from the chamber face of the printing plate.
Figure 8:
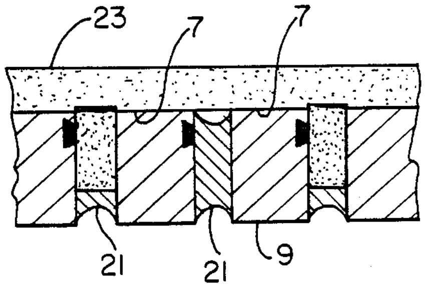
FIG. 8 shows the detailed cross-section of the printing plate of FIG. 7 with a substrate brought into contact with the printing surface or orifice of the printing plate.

One method of printing with the present apparatus will now be described with reference to FIGS. 3 through 9. Beginning with FIG. 3, the container 19 is heated by any convenient heater (not shown) for melting the phase-change or hot melt ink 21. After the ink 21 is completely melted or liquified, the chamber or ink receiving face 9 of the printing plate 1 is immersed or brought into contact with the pool of hot melt ink 21 in container 19. As shown in FIG. 4, as the printing plate 1 heats toward a temperature approaching that of the temperature of the hot melt ink 21, ink 21 is drawn into each one of the holes 3 via capillary action as shown. After the ink 21 has filled the holes 3 of printing plate 1, the printing plate 1 is removed form the pool of liquified hot melt ink 21, as shown in FIG. 5. The still liquid ink 21 filling the holes 3 is held in the holes 3 by capillarity. When the printing plate 1 sufficiently cools toward room temperature, the ink 21 solidifies within the holes 3, as shown in FIG. 6.

After the ink 21 has solidified in the holes 3, a desired character or pattern can be printed via closure of appropriate ones of the switches 15 of controller 11 for energizing selected ones of the resistive heaters 5, for melting the ink 21 within selected holes 3 forming a desired pattern. As partially shown in the sectional view of section 7, for the 3 holes shown, the outermost two holes have energized resistive heaters 5 (depicted pictorally via the connection of a battery 23 to the energized resistive elements 5. As the ink 21 melts in the portions of holes 3 near the energized heaters 5, the ink 21 expands in a direction away from a still solid portion of ink in a lower portion in the selected holes 3 near the chamber face 9 of the printing plate 1, as shown. Eventually, sufficient ink 21 will melt and expand acting as a driver to cause ink to protrude from the selected ones of the holes 3 above the surface of the orifice face 7, as shown. As previously mentioned, it is important that the material of the printing plate 1 have low heat conductivity, to insure that the ink 21 in the portions of the holes 3 near the chamber face 9 remains solidified, for insuring that the liquified ink 21 thereabove in the selected holes 3 undergoes a volume expansion for causing the ink to protrude from the selected holes at the orifice face 7. Ink 21 in the non-selected holes 3 remains solid.

Figure 9:
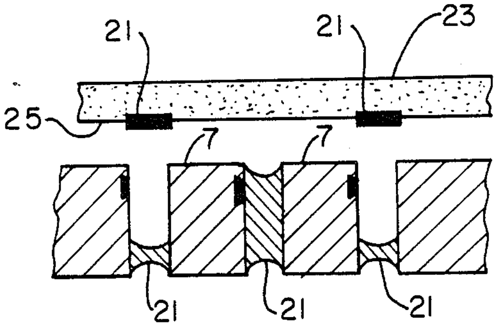
FIG. 9 shows the initial removal of the substrate from the printing surface or orifice face of the printing plate detailed cross-section of FIG. 8.

After the ink 21 within the selected ones of the holes 3 has sufficiently melted to cause ink 21 to exude out of the selected holes 3 above the orifice face 7, substrate 23 is brought into intimate contact or close proximity with the surface of the orifice face 7, whereupon the substrate 23 either absorbs or has the ink 21 adhere to the contacting surface thereof, as shown in FIG. 9. When the substrate 23 is removed from the orifice face 7 of the printing plate 1, the desired pattern of dots of ink 21 remain on the contacting surface 25 of the substrate 23, thereby printing the desired pattern thereupon. As shown, for the holes 3 where the associated resistive heating elements 5 were not energized, the ink 21 remains in solid form, and no ink transfer has occurred from the non-selected holes to the substrate 23.

One alternative to the present method of printing, is to bring the substrate 23 into contact with the orifice face 7 prior to energizing the resistive heaters 5 of the selected ones of the holes 3. The particular approach utilized may depend upon the composition of the particular hot-melt or phase change ink 21 utilized, the composition of the substrate 23, and so forth. Also, the particular controller 11 could also be provided by an array of selectively operable solid state switching devices, perhaps via or under microprocessor control (not shown), for example. In this regard, other modifications or changes to the present invention as described may be recognized by those of skill in the art which are within the meaning, scope, and range of the appended claims which follow. For example, a laser beam selectively scanned into individual holes 3, could be used in place of the resistive heaters 3.

What is claimed is:

1. In either a page, or line, or plural dots, at a time phase change ink printer, respectively, including a printing plate having an array of through holes each providing an orifice of capillary dimension, and a pool of phase change ink that is solid at room temperature and liquid at some elevated temperature, the method comprising the steps of:

(a) heating said pool of ink to liquify the ink;

(b) contacting a receiving side of said plate with the liquified phase change ink for a sufficient time to permit said plate to increase in temperature, whereby all of the orifices of said plate become filled with ink via capillary action;

(c) withdrawing said plate from said pool of liquified ink;

(d) cooling said plate for solidifying the ink in said orifices;

(e) heating selected ones of said orifices at the uppermost ends thereof for first melting the ink at these ends, whereby as the ink melts it expands in a direction away from the remaining solid ink in the selected orifices, respectively, and protrudes from each one of said selective orifices on a "printing" side of said plate;

(f) placing a substrate into contact with the surface of the "printing" side of said plate, whereby said substrate receives the ink protrusions for printing a desired image thereon; and (g) removing said substrate from said plate, for completing the printing cycle.

2. The method of printing of claim 1, further including the step:

(h) iteratively repeating steps (b)-(g) for printing either the same or other patterns or images upon other substrates.

3. In a high density array printer for printing dots on a substrate with a phase change ink that is solid at room temperature, and liquid at some temperature above room temperature, said printer including a printing plate having an array of through holes of capillary dimension between a printing face and an opposing ink receiving face thereof, with individual and selectively operable heaters mounted in the interior walls of said through holes near the printing face and remote from the receiving face of said printing plate, the printer further including a container of said plate change ink for receiving said printing plate, a method of printing comprising:

(a) heating said container to liquify the phase change ink therein;

(b) immersing the ink receiving side of said printing plate into said ink for a time period permitting said through holes to fill with ink via capillary action;

(c) removing said plate from said ink;

(d) cooling said plate for solidifying the ink in said holes;

(e) selectively energizing different ones of said heaters, for melting the ink in the respective holes near said printing face while maintaining in a solid phase the ink near the receiving face of the holes, whereby as the ink melts therein it expands in a direction away from the remaining solid ink in the selected holes, respectively, and protrudes from each one of the selected holes on the printing face of said printing plate;

(f) laying a substrate into intimate contact with the surface of said printing face, whereby ink protrusions are received by said substrate for printing a desired pattern of dots thereon; and (g) removing said substrate from said printing face in completion of the printing cycle.

4. The method of printing of claim 3, further including:

(h) repeating steps (a) through (g) for printing either the same or other patterns of dots upon other substrates.

5. A high density array printing apparatus for printing a desired pattern of dots on a substrate with a phase change ink, said ink being solid at room temperature and liquid at elevated temperatures from room temperature, said apparatus comprising:

a printing plate having a top "orifice" surface, and a bottom "chamber" surface, and a plurality of holes of capillary dimension through said orifice and chamber surfaces, providing an array of ink chamber/orifices in said printing plate;

a plurality of selectively energizeable individual heating means mounted on the walls of said holes, respectively, near the orifice surface of said printing plate, for heating selected ones of said holes in portions remote from the chamber surface of said printing plate;

container means for holding and heating said phase change ink to a liquid state, thereby providing a pool of liquified ink; and control means for energizing selected ones of said heating means, whereby printing is accomplished by immersing the chamber surface of said printing plate into the pool of liquified ink for a period of time allowing said holes to fill with ink via capillary action, the printing plate being thereafter removed from the pool of ink and allowed to cool for solidifying the ink in said holes, said control means then being operated to energize selected ones of said heating means for causing the ink in the respective holes to melt near the orifice surface of said printing plate, the ink expanding as it melts in a direction away from the solid ink still remaining in the respective holes near the chamber surface, causing the ink to protrude out of the holes on the orifice surface, thereby forming a desired pattern of protruding ink, thereon, for transfer to a substrate brought into contact with the orifice surface.

6. The printer of claim 5, wherein the diameter of said holes is either equal to or less than $3\times10^{-3}$ inch.

7. The printer of claim 5, wherein said printing plate is made from a relatively low heat conductive material.

8. The printer of claim 5, wherein said printing plate is fabricated from heat resistant plastic.

9. The printer of claim 5, wherein the material of said printing plate is ceramic.

10. The printer of claim 5, wherein said phase change ink comprises a natural wax.

11. The printer of claim 5, wherein said printing plate is at least $8\frac{1}{2}$ inches by 11 inches, for providing a page at a time printer.

* * * * *